(12) United States Patent
Gaffe et al.

(10) Patent No.: US 7,987,671 B2
(45) Date of Patent: Aug. 2, 2011

(54) MASTER CYLINDER COMPRISING A HELICAL RESUPPLY GROOVE

(75) Inventors: Francois Gaffe, Bondy (FR); Antony Auguste, Villier sur Marne (FR); Laurent Lhuillier, Le Blanc Mesnil (FR); Andrew Wasson, Wooster, OH (US)

(73) Assignee: Robert Bosch GmbH, Stuttgart (DE)

( * ) Notice: Subject to any disclaimer, the term of this patent is extended or adjusted under 35 U.S.C. 154(b) by 563 days.

(21) Appl. No.: 12/124,611

(22) Filed: May 21, 2008

(65) Prior Publication Data
US 2008/0289331 A1 Nov. 27, 2008

(30) Foreign Application Priority Data
May 21, 2007 (FR) ..................................... 07 03599

(51) Int. Cl.
*B60T 11/28* (2006.01)
*B60T 11/16* (2006.01)
(52) U.S. Cl. ................ 60/562; 60/588; 60/589
(58) Field of Classification Search .................... 60/562, 60/585, 588, 589
See application file for complete search history.

(56) References Cited

U.S. PATENT DOCUMENTS

| 4,429,531 A | * | 2/1984 | Spielmann ....................... 60/588 |
| 6,848,257 B2 | * | 2/2005 | Bacardit et al. ................. 60/562 |
| 2004/0128995 A1 | | 7/2004 | Bacardit et al. |
| 2005/0115237 A1 | | 6/2005 | Tsubouchi et al. |
| 2007/0068154 A1 | | 3/2007 | Bernadat et al. |

OTHER PUBLICATIONS

FR0703599 Search Report and Written Opinion.

* cited by examiner

*Primary Examiner* — Thomas E Lazo
(74) *Attorney, Agent, or Firm* — Michael Best & Friedrich LLP

(57) ABSTRACT

Brake master cylinder (10) for a motor vehicle, of the type which comprises a substantially axial body (12) inside a bore (14) of which is slideably mounted at least one axial piston, of the type in which the bore (14) comprises two seals, front and rear, interposed between the piston and the bore (14), characterized in that it comprises at least one wide groove (66, 68) which is formed in the bore (14) in front of a groove (70, 72) for retaining the front seal, which extends at least in part around the piston, and which communicates with said retaining groove (70, 72) and the hole in the piston, in order to allow resupplies to occur with a high flow rate.

20 Claims, 3 Drawing Sheets

MASTER CYLINDER COMPRISING A HELICAL RESUPPLY GROOVE

BACKGROUND AND SUMMARY OF THE INVENTION

The invention relates to a brake master cylinder for a motor vehicle.

The invention relates more specifically to a brake master cylinder for a motor vehicle, of the type which comprises a substantially axial body inside a bore of which is slideably mounted at least one axial piston which is capable of being actuated by a driver of the vehicle between a rear rest position and a forward braking force application position, and which is returned elastically toward its rear rest position against an end stop formed in the body, of the type in which the bore comprises two seals, front and rear, which are interposed between the piston and the bore, the front seal delimiting, in the bore, a rear supply chamber and a front pressure chamber, of the type in which the body comprises a radial supply duct which connects an external hydraulic fluid reservoir to the rear supply chamber and which opens out between the two seals, of the type in which the body comprises a braking circuit supply hole which opens into the front pressure chamber, of the type in which the piston comprises a bore, open to the front, communicating on the one hand with the front pressure chamber and on the other hand with the periphery of said piston by way of at least one hole which, when the piston occupies its rear rest position, is arranged between the two seals so as to open communication between the front pressure chamber and the rear supply chamber and which, when the piston is moved axially forward toward its application position, is capable of passing beyond the front seal in order to isolate the front pressure chamber from the rear supply chamber and thus make it possible to establish a braking pressure in the front pressure chamber, of the type in which at least each front seal comprises at least one lip, arranged in contact with the periphery of the piston, which is capable, when the front pressure chamber is exposed to a partial vacuum caused by the return of the piston from its forward application position to its rest position or else by the activation of a trajectory control device forming part of the braking circuit, of separating from the periphery of the piston so as to respectively allow to be resupplied the reservoir by means of the front pressure chamber or else the front pressure chamber to be resupplied by the reservoir.

Many examples of brake master cylinders of this type are known.

In most master cylinders of this type, the piston is generally guided in the bore by way of at least two annular bearing surfaces of the bore, these surfaces being respectively arranged in front of the front seal and to the rear of the rear seal.

The bearing surface which is arranged in front of the front seal adjoins the retaining groove which accommodates the front seal and it comprises so-called resupply grooves which are intended to allow brake fluid to flow through these grooves when the front pressure chamber is exposed to a partial vacuum caused by the return of the piston from its forward application position to its rest position or else when an "ESP"-type trajectory control device of the braking circuit is activated and generates a partial vacuum in the front pressure chamber.

In these conditions, the front seal separates from the periphery of the piston under the effect of the partial vacuum to which it is exposed, thereby respectively allowing the reservoir to be resupplied by means of the front pressure chamber or else the front pressure chamber to be resupplied by the reservoir.

Conventionally, the resupply grooves are produced in the form of a plurality of parallel helical grooves of reduced size, this size being imposed by the reduced length of the bearing surface which is arranged in front of the front seal.

What has been found in many cases, however, is that the brake fluid flow rate is insufficient for resupply to proceed correctly.

This is particularly evident when the vehicle is equipped with an "ESP"-type trajectory control device, in which case the demand for brake fluid, which is intended to supply one or more of the brake calipers of the vehicle, can be high even when the piston is occupying an application position in the pressure chamber. An insufficient flow rate can lead to a lack of efficiency, or at least to a detrimentally slow reaction of the "ESP"-type trajectory control device.

To overcome this disadvantage, the invention provides a brake master cylinder comprising means for increasing the resupply flow rate.

To this end, the invention provides a brake master cylinder of the above-described type, characterized in that it comprises at least one wide groove which is formed in the bore in front of a groove for retaining the front seal, which extends at least in part around the piston, and which communicates with said retaining groove and the hole in the piston, in order to allow the resupplies to occur with a high flow rate.

According to other features of the invention: the groove is a helical groove with a large specified pitch, the helical groove extends axially over a distance which is less than the specified pitch, the groove opens directly into the retaining groove for the front seal, the master cylinder comprises at most two wide grooves associated with the retaining groove for the front seal and with the piston, the master cylinder is of the tandem type and it comprises, in its substantially axial body, a bore inside which two axial pistons are slideably mounted, and two front seals, and in which are formed at least two and at most four associated grooves.

BRIEF DESCRIPTION OF THE DRAWINGS

Other features and advantages of the invention will become apparent on reading the detailed description below which will be understood by referring to the appended drawings, in which.

DETAILED DESCRIPTION

In the description which follows, identical reference numbers denote parts which are identical or have similar functions.

By convention, the terms "front", "forward" and "rear" respectively denote elements or positions respectively oriented toward the left and the right of the figures.

Figure 2:
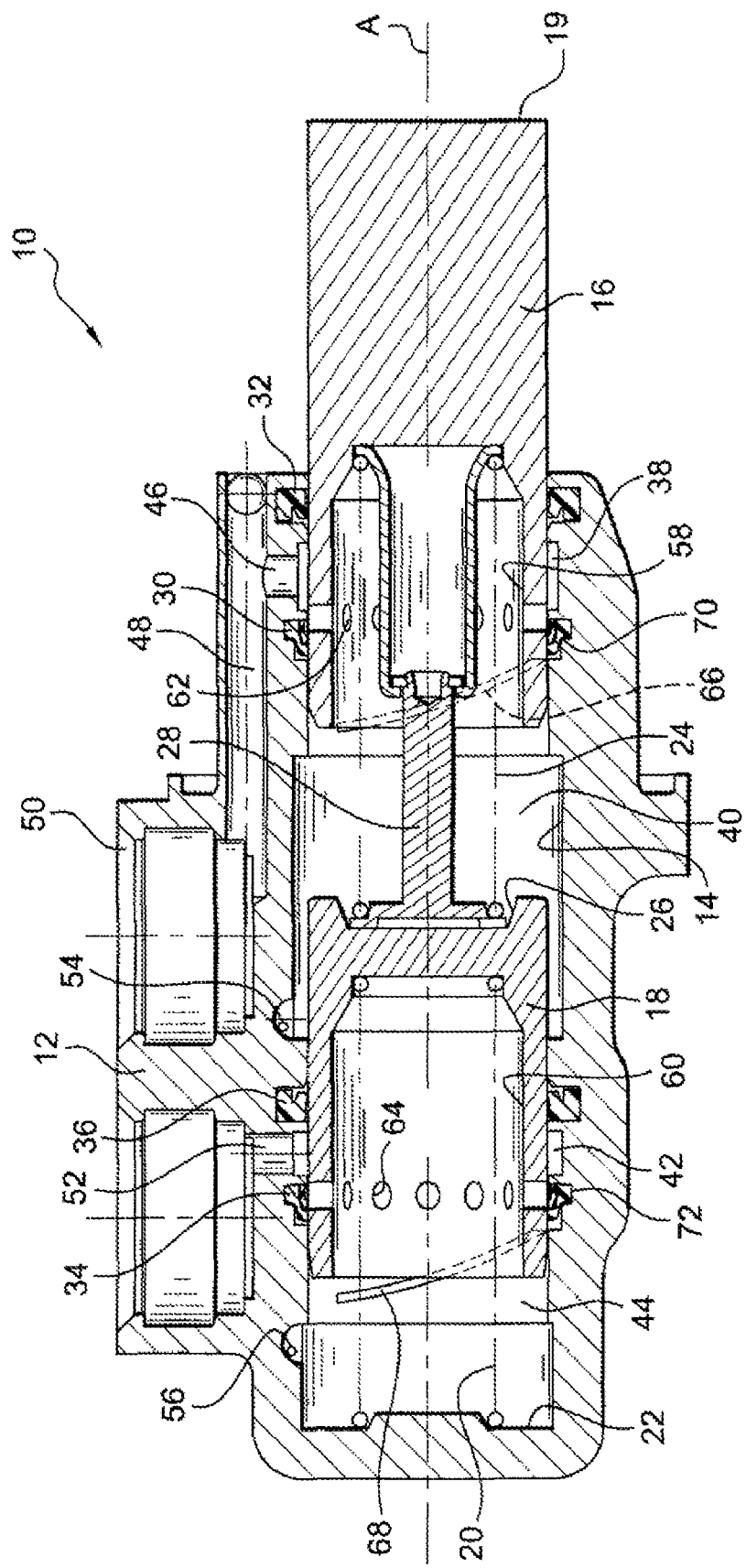
FIG. 2 is a view in axial section of a "tandem"-type master cylinder with its pistons represented in the rest position.
Figure 3:
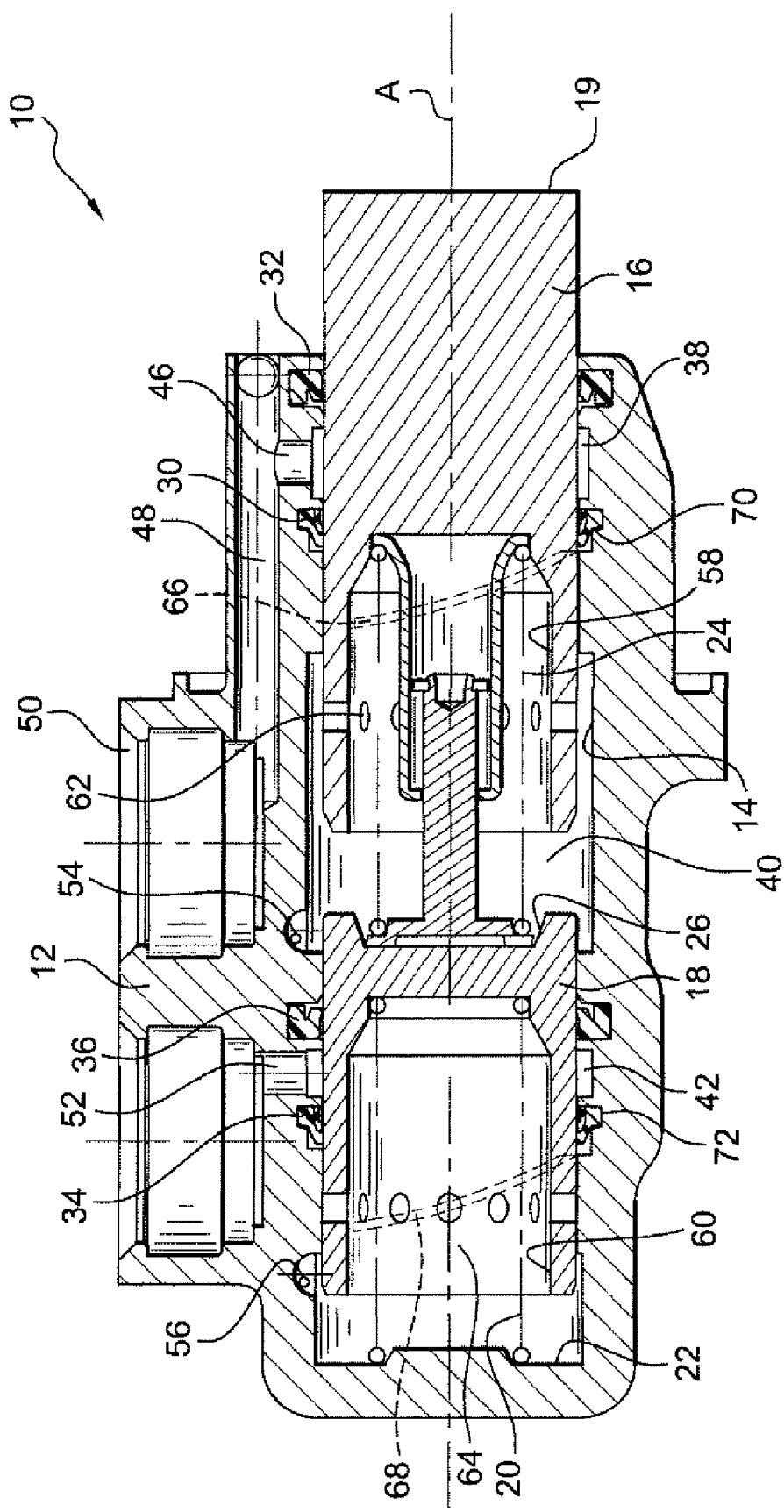
FIG. 3 is a view in axial section of a "tandem"-type master cylinder with its pistons represented in the actuating position.

FIGS. 2 and 3 show the whole assembly of a brake master cylinder 10 for a motor vehicle.

In a known manner, the master cylinder 10 comprises a substantially axial body 12, of axis "A", inside a bore 14 of which at least one axial piston is slideably mounted.

In the preferred embodiment of the invention, the master cylinder 10 is a "tandem"-type master cylinder which comprises a substantially axial body 12, of axis A, inside a bore 14 of which two axial pistons 16 and 18 are slideably mounted.

However, this configuration does not impose any limitation on the invention, and the master cylinder 10 could be a simple master cylinder having only one sliding piston.

The piston 16, termed primary piston 16, is intended to allow a hydraulic pressure to be established in a primary braking circuit (not shown) of the vehicle, and the piston 18, termed secondary piston 18, is intended to allow a hydraulic pressure to be established in a secondary braking circuit (not shown) of the vehicle that is independent of the primary braking circuit of the vehicle.

Each of these two circuits is associated with a trajectory control device which is capable of actuating vehicle braking components, such as brake calipers, independently of the master cylinder.

The primary piston 16 is capable of being actuated directly by a driver of the vehicle. For example, a rear end 19 of the primary piston 16 is capable of being connected to a booster (not shown) which amplifies the forces exerted on a vehicle brake pedal.

The secondary piston 18 is capable of being actuated indirectly by the driver of the vehicle, in particular by the primary piston 16.

Each primary 16 or secondary 18 piston is thus able to move between a rear rest position, which is represented in FIG. 2, and at least one forward braking force application position, which has been represented in FIG. 3.

In a known manner, each primary 16 or secondary 18 piston is returned elastically toward its rear rest position, for example against an end stop (not shown).

In particular, the secondary piston 18 is returned toward the rear by a spring 20 which bears against a transverse front end face 22 of the bore 14 and against the secondary piston 18, and the primary piston 16 is returned elastically toward the rear by a spring 24 which bears against a transverse rear face 26 of the secondary piston 18 and against the primary piston 16. More specifically, since the spring 24 is long in particular, it is mounted around a sliding ram 28 which is interposed between the transverse rear face 26 of the secondary piston 18 and the primary piston 16.

The bore 14 comprises two primary seals, front 30 and rear 32, which are respectively interposed between the primary piston 16 and the bore 14, and two secondary seals, front 34 and rear 36, which are respectively interposed between the secondary piston 18 and the bore 14.

Consequently, the front primary seal 30 delimits, in the bore 14, a rear supply chamber 38 and a front pressure chamber 40. Similarly, the front secondary seal 34 delimits, in the bore 14, a rear supply chamber 42 and a front pressure chamber 44.

The body 12 comprises a primary radial supply duct 46 which connects an external primary hydraulic fluid reservoir (not shown) to the primary rear supply chamber 38 and which opens out between the two primary seals 30 and 32.

In particular, the primary radial supply duct 46 is, for example, connected by way of an intermediate longitudinal duct 48 to an orifice 50 which opens to the outside of the body 14 and which is intended to accommodate an outlet (not shown) of the associated primary reservoir.

The body 12 comprises a secondary radial supply duct 52 which connects an external secondary hydraulic fluid reservoir (not shown) to the secondary rear supply chamber 42 and which opens out between the two secondary seals 34 and 36.

The body further comprises two holes, primary 54 and secondary 56, for supplying the associated primary and secondary braking circuits, these holes opening into the associated primary 40 and secondary 44 front pressure chambers.

In a known manner, each piston 16, 18 comprises a bore 58, 60, open toward the front, communicating on the one hand with the associated front pressure chamber 40, 44 and on the other hand with the periphery of said piston 16, 18 by way of at least one hole 62, 64 whose position with respect to the associated primary or secondary front seal 30, 34 determines the selective opening of communication between the primary and secondary rear supply chambers 38, 42 and the primary and secondary front pressure chambers 40, 44.

Thus, when the piston 16, 18 occupies its rear rest position shown in FIG. 2, the associated hole 62, 64 is arranged between the two primary 30, 32 and secondary 34, 36 seals so as to open communication between the front pressure chamber 40, 44 and the rear supply chamber 38, 42.

When the piston 16, 18 is moved axially forward toward its application position shown in FIG. 3, the hole 62, 64 passes beyond the front seal 30, 34 so as to isolate the front pressure chamber 40, 44 from the rear supply chamber 38, 42, thereby establishing a braking pressure in each front pressure chamber 40, 44.

Moreover, each front seal 30, 34 comprises at least one lip which is arranged in contact with the periphery of the corresponding piston 16, 18.

When the piston 16, 18 returns from its forward application position to its rest position, or when a trajectory control device forming part of the braking circuit connected to the primary and secondary braking circuits is activated, as represented in FIG. 3, a partial vacuum is generated in the primary and secondary front pressure chambers 40, 44, the effect of which is to separate the lip of the front seal 30, 34 from the periphery of the piston 16, 18.

The separation of the seal lip makes it possible for the primary 46 and secondary 52 radial supply ducts, and hence the associated reservoirs, to be resupplied by the primary and secondary front pressure chambers 40, 44 when the piston 16, 18 returns from its forward application position to its rest position.

In an analogous manner, the separation of the seal lip makes it possible for the primary and secondary front pressure chambers 40, 44 to be resupplied by the primary 46 and secondary 52 radial supply ducts, and hence by the associated reservoirs, when a trajectory control device of the braking circuit connected to the primary and secondary braking circuits is activated.

In a conventional master cylinder (not shown), a bearing surface which is arranged in front of the front seal adjoins the retaining groove for the front seal and comprises so-called resupply grooves which are intended to facilitate the flow of the brake fluid, as mentioned above.

These resupply grooves are generally produced in the form of a plurality of parallel helical grooves of reduced size, this size being imposed by the reduced length of the bearing surface which is arranged in front of the front seal.

What has been found in many cases, however, is that the brake fluid flow rate is insufficient for resupply to proceed correctly.

The invention proposes overcoming this disadvantage by providing a brake master cylinder 10 comprising means for increasing the resupply flow rate.

To this end, the invention provides a brake master cylinder 10 of the above-described type, characterized in that it comprises at least one wide groove 66, 68 which is formed in the bore in front of a retaining groove 70, 72 for the front seal 30, 34, which extends at least in part around the piston 16, 18, and which communicates with said retaining groove 70, 72 and the hole 62, 64 in the piston 16, 18, in order to allow the resupplies to occur with a high flow rate.

Thus, as illustrated in FIG. 2, when the piston 16, 18 occupies its rest position, a resupply can take place only via the holes 62, 64 in the piston 16, 18.

When the piston 16, 18 returns from its forward application position to its rest position, or when a trajectory control device forming part of the braking circuit connected to the primary and secondary braking circuits is activated, as represented in FIG. 3, the resupply takes place, in one or other direction, by following a route via the holes 62, 64, the groove 66, 68, the retaining groove 70, 72 for the seal 30, 34, the seal 30, 34 whose lip is separated, and the periphery of the piston 16, 18.

Figure 1:
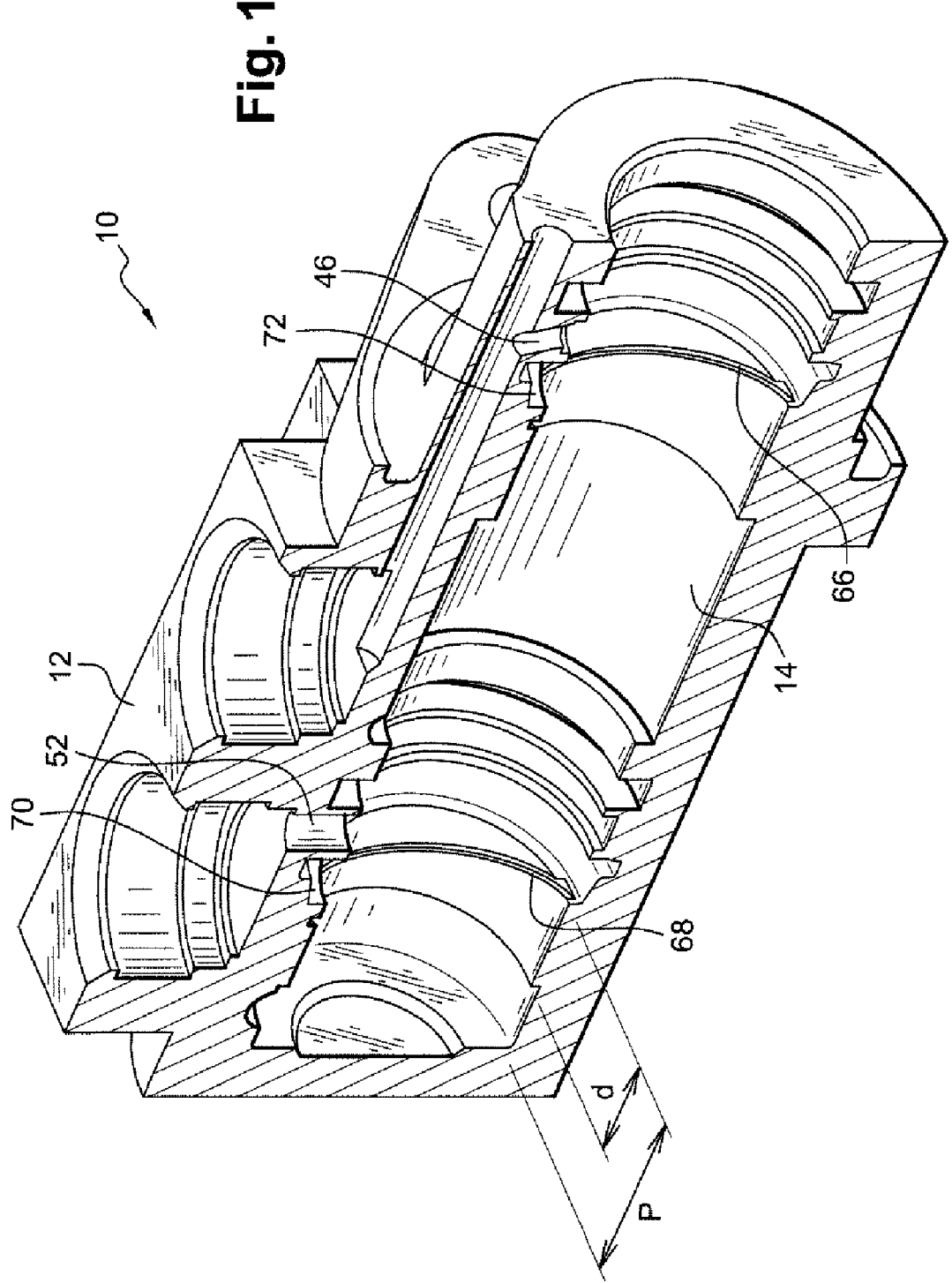
FIG. 1 is a perspective cutaway view of the body of a "tandem"-type master cylinder according to the invention.

More particularly, as illustrated in FIG. 1, the groove 66, 68 is a helical groove with a large specified pitch "p". By way of example, and with no limitation on the invention, this pitch "p" is approximately 15 to 25 mm.

The groove 66, 68 does not necessarily extend right around the piston 16, 18. It is only required that it extend angularly over approximately 120 degrees to allow a correct resupply. To this end, the helical groove 66, 38 extends axially over a distance "d" which is less than the specified pitch "p".

To allow suitable communication between the groove 66, 68 and the retaining groove 70, 72 for the front seal 30, 34, the groove 66, 68 opens directly into the retaining groove 70, 72 for the front seal 30, 34.

It is of course possible to increase the number of helical grooves 66, 68 so as to increase the resupply flow rate. However, since these grooves 66, 68 are formed by a machine tool after the bore 14 has been produced, and not by molding while the body 14 is being molded, their number must thus be limited to allow a correct production of said grooves 66, 68.

Moreover, since these grooves 66, 68 each have a large size, an excessive number of grooves would compromise the guidance of the pistons 16, 18.

Accordingly, the master cylinder 10 comprises at most two wide grooves 66, 68 associated with each retaining groove 70, 72 for the front seal and with each piston 16.

It will thus go without saying that, since the master cylinder is a tandem-type master cylinder, it comprises at least two and at most four grooves associated with the pistons 16, 18.

The invention thus makes it possible to have a master cylinder by means of which brake fluid reservoirs and/or associated braking circuits can be resupplied rapidly.

The invention claimed is:

1. Brake master cylinder (10) for a motor vehicle, the master cylinder (10) comprising a substantially axial body (12) inside a bore (14) of which is slideably mounted at least one axial piston (16, 18) which is capable of being actuated by a driver of the vehicle between a rear rest position and a forward braking force application position, and which is returned elastically toward its rear rest position, the bore (14) comprising two seals, front (30, 34) and rear (32, 36), which are interposed between the piston (16, 18) and the bore (14), the front seal (30, 34) delimiting, in the bore (14), a rear supply chamber (38, 42) and a front pressure chamber (40, 44), the body (12) comprising a radial supply duct (46, 52) which connects an external hydraulic fluid reservoir to the rear supply chamber (38, 42) and which opens out between the two seals (30, 32, 34, 36), the body (12) comprising a braking circuit supply hole (54, 56) which opens into the front pressure chamber (40, 44), the piston comprising a bore (58, 60), open to the front, communicating on the one hand with the front pressure chamber (40, 44) and on the other hand with the periphery of said piston (16, 18) by way of at least one hole (62, 64) which, when the piston (16, 18) occupies its rear rest position, is arranged between the two seals (30, 32, 34, 36) so as to open communication between the front pressure chamber (40, 44) and the rear supply chamber (38, 42) and which, when the piston (16, 18) is moved axially forward toward its application position, is capable of passing beyond the front seal (30, 34) in order to isolate the front pressure chamber (40, 44) from the rear supply chamber (38, 42) and thus make it possible to establish a braking pressure in the front pressure chamber (40, 44), at least each front seal (30, 34) comprising at least one lip, arranged in contact with the periphery of the piston (16, 18), which is capable, when the front pressure chamber (40, 44) is exposed to a partial vacuum caused by the return of the piston (16, 18) from its forward application position to its rest position or else by the activation of a trajectory control device forming part of the braking circuit, of separating from the periphery of the piston (16, 18) so as to respectively allow the reservoir to be resupplied by means of the front pressure chamber (40, 44) or else the front pressure chamber (40, 44) to be resupplied by the reservoir, characterized in that the master cylinder (10) comprises at least one wide groove (66, 68) which is formed in the bore (14) in front of a groove (70, 72) for retaining the front seal (30, 34), which extends at least in part around the piston (16, 18), and which communicates with said retaining groove (70, 72) and the hole (62, 64) in the piston, in order to allow the resupply to occur with a high flow rate, and characterized in that, in at least the application position of the piston (16, 18), the groove (66, 68) is in communication with the front pressure chamber (40, 44) only through the hole (62, 64).

2. Brake master cylinder (10) according to claim 1, characterized in that the groove (66, 68) is a helical groove with a large specified pitch (p).

3. Brake master cylinder (10) according to claim 2, characterized in that the helical groove (66, 68) extends axially over a distance (d) which is less than the specified pitch (p).

4. Brake master cylinder (10) according to claim 1, characterized in that the groove (66, 68) opens directly into the retaining groove (70, 72) for the front seal (30, 34).

5. Brake master cylinder (10) according to claim 1, characterized in that the master cylinder (10) at most comprises two wide grooves (66, 68) associated with the retaining groove (70, 72) for the front seal (30, 34) and with the piston (16, 18).

6. Brake master cylinder (10) according to claim 1, characterized in that the master cylinder (10) is of the tandem type and comprises, in its substantially axial body (12), a bore inside which two axial pistons (16, 18) are slideably mounted, and two front seals (30, 34), and in which are formed at least two and at most four associated grooves (66, 68).

7. Brake master cylinder (10) according to claim 1, characterized in that the body (12) comprises a bearing surface forward of the retaining groove (70, 72), the bearing surface having a radially-extending rearward wall defining the forward end of the retaining groove (70, 72) and a radially-extending forward wall spaced axially forward of the rearward wall, an axial length of the bearing surface being defined between the rearward wall and the forward wall, and characterized in that the at least one wide groove (66, 68) is defined in a portion of the bearing surface, the at least one wide groove opening through the rearward wall, the at least one wide groove (66, 68) extending an axial length less than the axial length of the bearing surface.

8. Brake master cylinder (10) according to claim 7, characterized in that the body (12) comprises a bearing surface forward of the retaining groove (70, 72), the bearing surface having a radially-extending rearward wall defining the forward end of the retaining groove (70, 72) and a radially-extending forward wall spaced axially forward of the rearward wall, and characterized in that the at least one wide groove (66, 68) is defined in a portion of the bearing surface, the at least one wide groove opening through the rearward wall, the at least one wide groove (66, 68) not opening through the forward wall.

9. Brake master cylinder (10) according to claim 1, characterized in that the body (12) comprises a bearing surface forward of the retaining groove (70, 72), the bearing surface having a radially-extending rearward wall defining the forward end of the retaining groove (70, 72) and a radially-extending forward wall spaced axially forward of the rearward wall, and characterized in that the at least one wide groove (66, 68) is defined in a portion of the bearing surface, the at least one wide groove opening through the rearward wall, the at least one wide groove (66, 68) not opening through the forward wall.

10. Brake master cylinder (10) for a motor vehicle, the master cylinder (10) comprising a substantially axial body (12) inside a bore (14) of which is slideably mounted at least one axial piston (16, 18) which is capable of being actuated by a driver of the vehicle between a rear rest position and a forward braking force application position, and which is returned elastically toward its rear rest position, the bore (14) comprising two seals, front (30, 34) and rear (32, 36), which are interposed between the piston (16, 18) and the bore (14), the front seal (30, 34) delimiting, in the bore (14), a rear supply chamber (38, 42) and a front pressure chamber (40, 44), the body (12) comprising a radial supply duct (46, 52) which connects an external hydraulic fluid reservoir to the rear supply chamber (38, 42) and which opens out between the two seals (30, 32, 34, 36), the body (12) comprising a braking circuit supply hole (54, 56) which opens into the front pressure chamber (40, 44), the piston comprising a bore (58, 60), open to the front, communicating on the one hand with the front pressure chamber (40, 44) and on the other hand with the periphery of said piston (16, 18) by way of at least one hole (62, 64) which, when the piston (16, 18) occupies its rear rest position, is arranged between the two seals (30, 32, 34, 36) so as to open communication between the front pressure chamber (40, 44) and the rear supply chamber (38, 42) and which, when the piston (16, 18) is moved axially forward toward its application position, is capable of passing beyond the front seal (30, 34) in order to isolate the front pressure chamber (40, 44) from the rear supply chamber (38, 42) and thus make it possible to establish a braking pressure in the front pressure chamber (40, 44), at least each front seal (30, 34) comprising at least one lip, arranged in contact with the periphery of the piston (16, 18), which is capable, when the front pressure chamber (40, 44) is exposed to a partial vacuum caused by the return of the piston (16, 18) from its forward application position to its rest position or else by the activation of a trajectory control device forming part of the braking circuit, of separating from the periphery of the piston (16, 18) so as to respectively allow the reservoir to be resupplied by means of the front pressure chamber (40, 44) or else the front pressure chamber (40, 44) to be resupplied by the reservoir, characterized in that the master cylinder (10) comprises at least one wide groove (66, 68) which is formed in the bore (14) in front of a groove (70, 72) for retaining the front seal (30, 34), which extends at least in part around the piston (16, 18), and which communicates with said retaining groove (70, 72) and the hole (62, 64) in the piston, in order to allow the resupply to occur with a high flow rate, characterized in that the body (12) comprises a bearing surface forward of the retaining groove (70, 72), the bearing surface having a radially-extending rearward wall defining the forward end of the retaining groove (70, 72) and a radially-extending forward wall spaced axially forward of the rearward wall, an axial length of the bearing surface being defined between the rearward wall and the forward wall, and characterized in that the at least one wide groove (66, 68) is defined in a portion of the bearing surface, the at least one wide groove opening through the rearward wall, the at least one wide groove (66, 68) extending an axial length less than the axial length of the bearing surface.

11. Brake master cylinder (10) according to claim 10, characterized in that the groove (66, 68) is a helical groove with a large specified pitch (p), and that the helical groove (66, 68) extends axially over a distance (d) which is less than the specified pitch (p).

12. Brake master cylinder (10) according to claim 10, characterized in that the groove (66, 68) opens directly into the retaining groove (70, 72) for the front seal (30, 34).

13. Brake master cylinder (10) according to claim 10, characterized in that the master cylinder (10) at most comprises two wide grooves (66, 68) associated with the retaining groove (70, 72) for the front seal (30, 34) and with the piston (16, 18).

14. Brake master cylinder (10) according to claim 10, characterized in that the master cylinder (10) is of the tandem type and comprises, in its substantially axial body (12), a bore inside which two axial pistons (16, 18) are slideably mounted, and two front seals (30, 34), and in which are formed at least two and at most four associated grooves (66, 68).

15. Brake master cylinder (10) according to claim 10, characterized in that the body (12) comprises a bearing surface forward of the retaining groove (70, 72), the bearing surface having a radially-extending rearward wall defining the forward end of the retaining groove (70, 72) and a radially-extending forward wall spaced axially forward of the rearward wall, and characterized in that the at least one wide groove (66, 68) is defined in a portion of the bearing surface, the at least one wide groove opening through the rearward wall, the at least one wide groove (66, 68) not opening through the forward wall.

16. Brake master cylinder (10) for a motor vehicle, the master cylinder (10) comprising a substantially axial body (12) inside a bore (14) of which is slideably mounted at least one axial piston (16, 18) which is capable of being actuated by a driver of the vehicle between a rear rest position and a forward braking force application position, and which is returned elastically toward its rear rest position, the bore (14) comprising two seals, front (30, 34) and rear (32, 36), which are interposed between the piston (16, 18) and the bore (14), the front seal (30, 34) delimiting, in the bore (14), a rear supply chamber (38, 42) and a front pressure chamber (40, 44), the body (12) comprising a radial supply duct (46, 52) which connects an external hydraulic fluid reservoir to the rear supply chamber (38, 42) and which opens out between the two seals (30, 32, 34, 36), the body (12) comprising a braking circuit supply hole (54, 56) which opens into the front pressure chamber (40, 44), the piston comprising a bore (58, 60), open to the front, communicating on the one hand with the front pressure chamber (40, 44) and on the other hand with the periphery of said piston (16, 18) by way of at least one hole (62, 64) which, when the piston (16, 18) occupies its rear rest position, is arranged between the two seals (30, 32, 34, 36) so as to open communication between the front pressure chamber (40, 44) and the rear supply chamber (38, 42) and which, when the piston (16, 18) is moved axially forward toward its application position, is capable of passing beyond the front seal (30, 34) in order to isolate the front pressure chamber (40, 44) from the rear supply chamber (38, 42) and thus make it possible to establish a braking pressure in the front pressure chamber (40, 44), at least each front seal (30, 34) comprising at least one lip, arranged in contact with the periphery of the piston (16, 18), which is capable, when the front pressure chamber (40, 44) is exposed to a partial vacuum caused by the return of the piston (16, 18) from its forward application position to its rest position or else by the activation of a trajectory control device forming part of the braking circuit, of separating from the periphery of the piston (16, 18) so as to respectively allow the reservoir to be resupplied by means of the front pressure chamber (40, 44) or else the front pressure chamber (40, 44) to be resupplied by the reservoir, characterized in that the master cylinder (10) comprises at least one wide groove (66, 68) which is formed in the bore (14) in front of a groove (70, 72) for retaining the front seal (30, 34), which extends at least in part around the piston (16, 18), and which communicates with said retaining groove (70, 72) and the hole (62, 64) in the piston, in order to allow the resupply to occur with a high flow rate, characterized in that the body (12) comprises a bearing surface forward of the retaining groove (70, 72), the bearing surface having a radially-extending rearward wall defining the forward end of the retaining groove (70, 72) and a radially-extending forward wall spaced axially forward of the rearward wall, and characterized in that the at least one wide groove (66, 68) is defined in a portion of the bearing surface, the at least one wide groove opening through the rearward wall, the at least one wide groove (66, 68) not opening through the forward wall.

17. Brake master cylinder (10) according to claim 16, characterized in that the body (12) comprises a bearing surface forward of the retaining groove (70, 72), the bearing surface having a radially-extending rearward wall defining the forward end of the retaining groove (70, 72) and a radially-extending forward wall spaced axially forward of the rearward wall, an axial length of the bearing surface being defined between the rearward wall and the forward wall, and characterized in that the at least one wide groove (66, 68) is defined in a portion of the bearing surface, the at least one wide groove opening through the rearward wall, the at least one wide groove (66, 68) extending an axial length less than the axial length of the bearing surface.

18. Brake master cylinder (10) according to claim 16, characterized in that the groove (66, 68) is a helical groove with a large specified pitch (p), and that the helical groove (66, 68) extends axially over a distance (d) which is less than the specified pitch (p).

19. Brake master cylinder (10) according to claim 16, characterized in that the groove (66, 68) opens directly into the retaining groove (70, 72) for the front seal (30, 34).

20. Brake master cylinder (10) according to claim 16, characterized in that the master cylinder (10) at most comprises two wide grooves (66, 68) associated with the retaining groove (70, 72) for the front seal (30, 34) and with the piston (16, 18).

* * * * *